Patented Sept. 4, 1945

2,383,990

UNITED STATES PATENT OFFICE 2,383,990

PROLAMINE COATING MATERIALS

Sverre Quisling, Madison, Wis.

No Drawing. Application November 21, 1941,
Serial No. 419,985

8 Claims. (Cl. 167—85)

My invention relates to the coloring and cosmetic treatment of skin, lips, nails, and hair, by means of a suspension of water and alcohol insoluble inert finely divided coloring material in alcohol soluble proteins, technically known as prolamines.

This is a continuation in part of my patent application, Ser. No. 300,021, filed Oct. 18, 1939, on Carbohydrate materials, in which special study was made of carbohydrate materials combined with proteins, more particularly zein and gelatin, as a suspending base material for finely divided pigment materials. Further study has shown that certain proteins, more particularly those classified as prolamines, may be used in connection with extending agents other than carbohydrates and/or aqueous alcoholic wetting agents used therewith.

In the prior art, cosmetic coating materials carrying pigment materials included greases, lacquer, and carbohydrates. Greasy materials have the disadvantage of smearing and coming off on friction. Lacquer has the disadvantage of requiring a highly inflammable and ill-smelling solvent in its application and removal, as well as the tendency to crack off easily on friction. Carbohydrate materials have the tendency to become sticky and rub off easily when moist. All these disadvantages have been overcome by the use of prolamines as described in the present specification. The coating materials of my invention are flexible, do not crack off or come off easily on friction, do not come off or become sticky when moist, and the solvents for the prolamines are pleasant smelling and relatively not inflammable. Easily procurable solvent substances for applying my plastic materials include the lower alcohols, such as methyl, ethyl, propyl, and butyl alcohols and the lower glycols or preferably aqueous solutions of these solvents. Solvents for removing the coating material of my invention include the aforementioned solvents.

Another purpose of my invention is to provide a coating material that will be suitable to replace present cosmetics carrying dangerous coal tar dyes and unsatisfactory plastic color coatings having ill smelling local irritating solvents now used for coloring hair, skin, nails, and lips.

Another purpose of my invention is to provide a coating material which can be quickly and easily applied to hair, skin, nails, or lips, and also be quickly and easily removed, without danger of injury.

Another object of my invention is to provide a prolamine surface coating for hair suitable for serving as an improved setting, waving and/or curling agent which shall possess the advantage over the present substances used for that purpose of being of pleasant odor and less injurious to the hair. This would particularly pertain to the prior highly ammoniacal alkaline solutions applied to hair before permanent waving.

Another object of my invention is to provide a cosmetic which will combine economy with safety, and for which the ingredients may be easily obtainable in large quantities almost anywhere.

Other purposes and advantages of my invention will become apparent as the description in the specification proceeds.

This invention overcomes certain disadvantages of the compositions disclosed and claimed in my patent application, Serial No. 300,021, filed October 18, 1939, in which carbohydrate materials were combined with protein materials and depended on water as a solvent. The present invention contemplates a plastic coating material comprising a major portion of prolamine protein. These prolamines are obtained commercially chiefly from vegetable sources such as from corn, from wheat, from barley, and from other easily procured vegetation, and include zein, gliadin (prepared according to the method of Dill and Alsberg-Journal Biol. Chem. 1925, LXV, page 179), hordein, and kafirin. In the preferred form of my invention these prolamines are combined with relatively small amounts of extending substances, such as carbohydrate material in the form of sucrose, starch glycerite, or monosaccharides, for example dextrose, dextrin, and maltose, but other water-soluble extending agents also have been found to be satisfactory and will be set forth hereinafter. The property of the prolamine constituents which render them highly suitable and advantageous in the composition of this invention is their solubility in aqueous alcohol solutions, and their insolubility in water. Any protein materials having these properties are satisfactory, since by virtue of their very large molecular size they will have the requisite cohesive and adhesive qualities. Thus I am considering the term "prolamine" in its broad sense to include protein materials characterized by their solubility in aqueous ethyl alcohol and their lack of solubility in water alone regardless of their proline or phosphorous content. Such alcohol soluble proteins are, for example, also the alcohol soluble casein fraction prepared from other protein materials according to the procedure of Linderstrom-Lang et al. (Comptes Rendus du Laboratoire Carlsberg, 17, No. 9, pages 46 and 51, 1929), and analogous aqueous-alcohol soluble protein fractions from other protein materials.

Compounding procedures analogous with those described above are used for these various prolamines. In general, zein is completely soluble in aqueous alcohol solutions containing up to 93% and somewhat higher percentages of ethyl alcohol, and I have discovered that solutions containing somewhat higher percentages of alcohol may be employed as solvents for zein than for other prolamines. Other prolamines are generally sufficiently soluble for the purposes of my invention in aqueous solutions containing 50% to 90% alcohol. The solubility of prolamines in various aqueous-alcoholic mixtures comprising the various lower alcohols such as methyl, ethyl, propyl, and butyl alcohols and the lower glycols, is well-known to the art, and the choice of solvent combination is thus readily made according to the composition desired in the final product.

While zein is employed in most of the examples of preparations to follow, such illustration and reference is made because of its present ease of procurement commercially, and is made only by way of illustration, and not by way of limitation, the other prolamines also having been found satisfactory for the purpose of my invention.

Preparations made according to my invention comprise a major portion of prolamine, alcohol and water insoluble finely divided pigment material and preferably a small amount of water soluble extending materials such as carbohydrates (for example sucrose, dextrose, starch glycerite), organic salts (for example sodium acetate and sodium lactate), inorganic salts (for example sodium chloride and potassium chloride), and purely organic material (for example sorbitol and urea). It is thus obvious that a wide group of substances may be used as extending agents so long as they are water-soluble and non-toxic. Of these materials I preferred sucrose, although many other materials were employed with good results. Aqueous alcoholic wetting agents were found to enhance the ease with which the coating could be applied. The following preparations were found to be particularly good for this purpose: polymerized aliphatic alcohols, such as the commercial product known as "Triton M. A.," sulfated alkyl naphthalenes and sulfated esters of succinic or adipic acids, such as the products known as "Aerosols," glycol laurate, such as the product known as "Prolaurin," and phosphated long chain fatty alcohols, such as the products known as "Victor wetting agents." While the above mentioned wetting agents are preferred it is freely understood that their mention is by illustration only and not by way of limitation. Wetting agents dispersable and active in the compositions of the invention are broadly useful for this purpose.

It has been found that varying amounts of finely divided inert coloring pigment material produce various shades of color, but for the purposes of example it may be cited that 20% to 60% by volume of the following pigments were found specially useful with prolamine plastic base materials: Lamp black (carbon) for black, iron-oxide (yellow-ochre) for yellow, iron-oxide red for red, iron-oxide brown for brown, iron-oxide black for black, and zinc-oxide or titanium-oxide for white. If the pigment strength and the degree of subdivision is particularly favorable, I may use from 10% to 80% pigment in my final product, but the preferred range is from 20% to 60%. Other coloring materials including pigment lakes, certain oxides, certain sulphides, certain finely divided metallic powders such as bronze and aluminum, and other alcohol and water insoluble coloring materials alone or in combination were found useful. It is not the purpose of this description to limit the invention to specific pigments which are here noted only by way of example. However, the pigments mentioned have been found to have particular merit, for their non-toxicity, their economy and ease of procurement, as well as their excellent color-producing properties. For purposes of setting, waving, and curling hair, the use of pigments, of course, may be omitted in the prolamine coating materials.

It has been further found that certain pigments required the addition of a small percentage of colloidal inert inorganic substances to bring out their best coloring qualities, as for example, to produce a beautiful deep shade of black using carbon black with an equal volume of zein, the addition of 10% aerogel (colloidal silicon dioxide) was very useful. Bentonite, and to a lesser degree, colloidal kaolin, when added to carbon black and zein in small quantities, also tended to enhance the depth of color. When carbon black and zein alone were used without the addition of the colloidal inert inorganic material, very little color was obtained when attempts were made to coat it on hair or skin.

It has been found also that certain shades of color frequently would result from the use of a number of pigments incorporated in a single basic mix. For example, carbon black, zinc oxide white, and both red and yellow iron oxide were necessary to produce certain shades of red and yellow.

Although a prolamine base with an extending agent and an aqueous alcoholic wetting agent has been described as a preferred form of plastic material to be used as a suspending coating material for finely divided aqueous alcoholic insoluble pigment material, it has been found that prolamines may be used without either one or both the extending agent and the wetting agent as a suspending plastic for pigment to form satisfactory color coating material. This invention is therefore directed broadly to include plastic coating materials comprising prolamines with finely divided pigment materials suspended therein.

The following specific examples, by way of illustration and not by way of limitation, are set forth as adaptable for use as color coating materials for hair, skin, nails and lips.

(1) *Red coating*

| | Per cent |
|---|---|
| Red iron oxide (by volume) | 20 |
| Kafirin | 78 |
| Sucrose | 2 |

Dissolve in sufficient aqueous ethyl alcohol (about 70% alcohol in water) to make homogeneous solution, and apply to wooden paddles such as tongue depressors, and allow to dry, or pour in pans to dry, or pour into bottles and cork for use in connection with applicators.

(2) Red coating

| | Per cent |
|---|---|
| Red iron oxide (by volume) | 10 |
| Zein | 90 |

Prepare as in (1).

(3) Brown coating

| | Per cent |
|---|---|
| Brown iron oxide (by volume) | 48 |
| Gliadin | 42 |
| Starch glycerite | 8 |
| Bentonite | 2 |

Prepare as in (1).

(4) Black coating

| | Per cent |
|---|---|
| Carbon black (by volume) | 76 |
| Zein | 20 |
| "Aerogel" (colloidal silicon dioxide) | 4 |

Prepare as in (1).

(5) Yellow coating

| | Per cent |
|---|---|
| Zein (by volume) | 52 |
| Yellow iron oxide | 40 |
| Sodium chloride | 5 |
| "Prolaurin" (glycol mono-laurate) | 3 |

Prepare as in (1).

(6) White coating

| | Per cent |
|---|---|
| Zein (by volume) | 40 |
| Titanium oxide | 48 |
| "Triton M. A." (polymerized aliphatic alcohol) | 12 |

Prepare as in (1).

(7) Gold coating

| | Per cent |
|---|---|
| Bronze powder (by volume) | 50 |
| Zein | 42 |
| Sucrose | 4 |
| Bentonite | 2 |
| "Aerosol" (sulfated alkyl naphthalene and sulfated esters of succinic or adipic acid) | 2 |

Prepare as in (1).

(8) Silver coating

| | Per cent |
|---|---|
| Powdered aluminum (by volume) | 50 |
| Zein | 44 |
| "Victor Wetting Agent" (phosphated long chain fatty alcohol) | 4 |
| Bentonite | 2 |

Prepare as in (1).

(9) White coating

| | Per cent |
|---|---|
| Zinc oxide (by volume) | 50 |
| Hordein | 45 |
| "Prolaurin" (glycol mono-laurate) | 5 |

Prepare as in (1).

(10) Hair setting, waving or curling solution

| | Per cent |
|---|---|
| Zein | 20 |
| Sucrose | 3 |
| "Aerosol" | 2 |
| Water | 20 |
| Perfumed ethyl alcohol | 55 |

The zein referred to in the above examples was obtained from the American Maize Products Co., of Chicago, and is retailed as "Amaizo Brand Maizite." The iron oxide pigment materials, red, yellow, brown, and black, were manufactured by the Magnetic Pigment Co. of Trenton, New Jersey, and by the Harshaw Chemical Co. of Cleveland, Ohio. The carbon black was procured from Binney and Smith of New York city.

Extra finely divided pigment material produced the best results. By grinding some of the pigments with an inert dispersing agent such as colloidal silicon dioxide (aerogel) in a ball mill for six to eight hours to obtain the proper particle size pigment coloring materials, for example in the case of white zinc oxide and yellow iron oxide, marked improvement in the degree of intensity of color per unit depth of coating material was obtained.

It has been my experience that preparations of the above type of coating materials are most easily dispensed on paddles (similar to wooden tongue depressors) which can be dipped in an aqueous alcoholic solvent solution procured at drug stores as rubbing alcohol, or certain toilet waters, and applied to skin, lips, or hair. If the hair, skin, or lips is first moistened with a solvent solution, the coating may be applied more evenly and more rapidly. However, coating material which is permitted to harden in containers may be moistened with solvent, and a brush similar to a toothbrush may be used to take up coating material and apply it to the skin, lips, or hair. It has also been found equally practical to pour the coating mixture in solution into bottles and, after shaking, apply the mixture to applicators for use in coating hair, nails, lips, or skin. In all instances it has been found advisable to moisten the skin, lips, or hair with solvent before applying the coating, to obtain an even depth of color. Therapeutically, the coatings of my invention have a protectant action which may be of value in the amelioration of various skin conditions.

The odor of the coating material may be made very pleasant by adding a small amount of perfume to the solvent, either in the preparation of the coating material or in the use of a perfumed solvent when applying the coating material to hair, lips, nails or skin.

Although the major portion of my specification has been devoted to a description of the composition of coating materials rather than the manufactured product or article to which this coating is applied, the invention also includes hair having a surface coating comprising a major portion of prolamine. Thus by varying the pigment contained in such a prolamine surface coating, many useful hair products can be manufactured. In this manner fur of animals living or dead may be given new properties which may be of considerable value, as for example discolorations may be retouched or new color effects introduced. Of course human hair or whiskers may be retouched in the same manner. Furthermore, hair having a surface coating comprising a prolamine as described in my invention may be set, waved, or curled with or without the use of heat. The invention thus embraces, as one of its important novel features, an article of manufacture comprising a hair having a surface coating of prolamine composition described in the specification.

Having thus described my invention, what I claim is:

1. A non-tacky, substantially water insoluble color cosmetic coating material for hair, skin, nails and lips comprising a major portion of prolamine plastic base material which contains a relatively small amount of water soluble extending material and a finely divided pigment material suspended therein.

2. A non-tacky, substantially water insoluble color cosmetic coating material for hair, skin, nails and lips comprising a major portion of prolamine plastic base material which contains a relatively small amount of water soluble extending material, a small amount of an aqueous alcohol dispersible wetting agent and a finely divided pigment material suspended therein.

3. A non-tacky, substantially water insoluble cosmetic coating material for hair, skin, nails and lips comprising a major portion of prolamine plastic base material which contains a relatively small amount of water soluble extending material, and a small amount of an aqueous alcohol dispersible wetting agent.

4. A non-tacky, substantially water insoluble color cosmetic coating material for hair, skin, nails and lips comprising a major portion of zein which contains a relatively small amount of water soluble extending material and a finely divided pigment material suspended therein.

5. A dry, non-tacky, substantially water insoluble color cosmetic coating material for hair, skin, nails and lips comprising a major portion of zein which contains a relatively small amount of water soluble extending material, a small amount of an aqueous alcohol dispersible wetting agent and a finely divided pigment material suspended therein.

6. A non-tacky, substantially water insoluble color cosmetic coating material for hair, skin, nails and lips comprising a major portion of zein which contains a relatively small amount of sucrose, a small amount of an aqueous alcohol dispersible wetting agent and a finely divided pigment material suspended therein.

7. A dry, non-tacky, substantially water insoluble coating material for hair, skin, nails and the like which comprises a major portion of zein, a relatively small amount of sucrose and finely divided iron oxide.

8. A dry, non-tacky, substantially water insoluble coating material for hair, skin, nails and the like which comprises a major portion of zein, a relatively small amount of sucrose, a small amount of an aqueous alcohol dispersible wetting agent and finely divided iron oxide.

SVERRE QUISLING.